(12) United States Patent
Collins et al.

(10) Patent No.: US 8,583,326 B2
(45) Date of Patent: Nov. 12, 2013

(54) GNSS CONTOUR GUIDANCE PATH SELECTION

(75) Inventors: Dennis M. Collins, Fountain Hills, AZ (US); Michael D. Brown, Hiawatha, KS (US)

(73) Assignee: AgJunction LLC, Hiawatha, KS (US)

( * ) Notice: Subject to any disclaimer, the term of this patent is extended or adjusted under 35 U.S.C. 154(b) by 453 days.

(21) Appl. No.: 12/703,080

(22) Filed: Feb. 9, 2010

(65) Prior Publication Data

US 2011/0196565 A1    Aug. 11, 2011

(51) Int. Cl.
*A01B 69/00* (2006.01)
*G06F 19/00* (2011.01)
*G01S 19/39* (2010.01)

(52) U.S. Cl.
USPC .......................... 701/41; 701/50; 342/357.22

(58) Field of Classification Search
USPC ......... 701/213, 200, 50, 41, 23, 25, 301, 120, 701/26; 342/357.2–357.78, 358–362; 700/284, 253; 172/179
See application file for complete search history.

(56) References Cited

U.S. PATENT DOCUMENTS

| | | | |
|---|---|---|---|
| 3,585,537 A | 6/1971 | Rennick et al. | |
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A | 10/1979 | Frosch et al. | |
| 4,180,133 A | 12/1979 | Collogan et al. | |
| 4,398,162 A | 8/1983 | Nagai | |
| 4,453,614 A | 6/1984 | Allen et al. | |
| 4,529,990 A | 7/1985 | Brunner | |
| 4,637,474 A | 1/1987 | Leonard | |
| 4,667,203 A | 5/1987 | Counselman, III | |

(Continued)

FOREIGN PATENT DOCUMENTS

| | | | |
|---|---|---|---|
| JP | 4042802 | * | 8/1992 |
| JP | 404242802 | * | 8/1992 |

(Continued)

OTHER PUBLICATIONS

"International Search Report", PCT/US09/067693, (Jan. 26, 2010).

(Continued)

*Primary Examiner* — Muhammad Shafi
(74) *Attorney, Agent, or Firm* — Law Office of Mark Brown, LLC; Mark E. Brown; Christopher M. DeBacker (57) ABSTRACT

A GNSS-based contour guidance path selection system for guiding a piece of equipment through an operation, such as navigating a guide path, includes a processor programmed for locking onto a particular aspect of the operation, such as deviating from a pre-planned or original guidance pattern and locking the guidance system onto a new route guide path, while ignoring other guidance paths. The system gives a vehicle operator control over a guidance route without the need to re-plan a pre-planned route. The device corrects conflicting signal issues arising when new swaths result in the guidance system receiving conflicting directions of guidance where the new swaths cross predefined swaths. An operator can either manually, or with an autosteer subsystem automatically, maintain a new contour guidance pattern, even while crossing predefined guidance paths that would otherwise divert the vehicle.

1 Claim, 7 Drawing Sheets

(56) References Cited

U.S. PATENT DOCUMENTS

| | | |
|---|---|---|
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,813,991 A | 3/1989 | Hale |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |

(56) References Cited

U.S. PATENT DOCUMENTS

| | | | |
|---|---|---|---|
| 6,122,595 A | 9/2000 | Varley et al. | |
| 6,128,574 A | 10/2000 | Diekhans | |
| 6,144,335 A | 11/2000 | Rogers | |
| 6,191,730 B1 | 2/2001 | Nelson, Jr. | |
| 6,191,733 B1 | 2/2001 | Dizchavez | |
| 6,198,430 B1 | 3/2001 | Hwang et al. | |
| 6,198,992 B1 | 3/2001 | Winslow | |
| 6,199,000 B1 | 3/2001 | Keller et al. | |
| 6,205,401 B1 | 3/2001 | Pickhard et al. | |
| 6,215,828 B1 | 4/2001 | Signell et al. | |
| 6,229,479 B1 | 5/2001 | Kozlov et al. | |
| 6,230,097 B1 | 5/2001 | Dance et al. | |
| 6,233,511 B1 | 5/2001 | Berger et al. | |
| 6,236,916 B1 | 5/2001 | Staub et al. | |
| 6,236,924 B1 | 5/2001 | Motz | |
| 6,253,160 B1 | 6/2001 | Hanseder | |
| 6,256,583 B1 | 7/2001 | Sutton | |
| 6,259,398 B1 | 7/2001 | Riley | |
| 6,266,595 B1 | 7/2001 | Greatline et al. | |
| 6,285,320 B1 | 9/2001 | Olster et al. | |
| 6,292,132 B1 | 9/2001 | Wilson | |
| 6,307,505 B1 | 10/2001 | Green | |
| 6,313,788 B1 | 11/2001 | Wilson | |
| 6,314,348 B1 | 11/2001 | Winslow | |
| 6,325,684 B1 | 12/2001 | Knight | |
| 6,336,066 B1 | 1/2002 | Pellenc et al. | |
| 6,345,231 B2 | 2/2002 | Quincke | |
| 6,356,602 B1 | 3/2002 | Rodal et al. | |
| 6,377,889 B1 | 4/2002 | Soest | |
| 6,380,888 B1 | 4/2002 | Kucik | |
| 6,389,345 B2 | 5/2002 | Phelps | |
| 6,392,589 B1 | 5/2002 | Rogers et al. | |
| 6,397,147 B1 | 5/2002 | Whitehead | |
| 6,415,229 B1 | 7/2002 | Diekhans | |
| 6,418,031 B1 | 7/2002 | Archambeault | |
| 6,421,003 B1 | 7/2002 | Riley et al. | |
| 6,424,915 B1 | 7/2002 | Fukuda et al. | |
| 6,431,576 B1 | 8/2002 | Viaud et al. | |
| 6,434,462 B1 | 8/2002 | Bevly et al. | |
| 6,445,983 B1 | 9/2002 | Dickson et al. | |
| 6,445,990 B1 | 9/2002 | Manring | |
| 6,449,558 B1 | 9/2002 | Small | |
| 6,463,091 B1 | 10/2002 | Zhodzicshsky et al. | |
| 6,463,374 B1 | 10/2002 | Keller et al. | |
| 6,466,871 B1 | 10/2002 | Reisman et al. | |
| 6,469,663 B1 | 10/2002 | Whitehead et al. | |
| 6,484,097 B2 | 11/2002 | Fuchs et al. | |
| 6,501,422 B1 | 12/2002 | Nichols | |
| 6,515,619 B1 | 2/2003 | McKay, Jr. | |
| 6,516,271 B2 | 2/2003 | Upadhyaya et al. | |
| 6,539,303 B2 | 3/2003 | McClure et al. | |
| 6,542,077 B2 | 4/2003 | Joao | |
| 6,549,835 B2 | 4/2003 | Deguchi et al. | |
| 6,553,299 B1 | 4/2003 | Keller et al. | |
| 6,553,300 B2 | 4/2003 | Ma et al. | |
| 6,553,311 B2 | 4/2003 | Ahearn et al. | |
| 6,570,534 B2 | 5/2003 | Cohen et al. | |
| 6,577,952 B2 | 6/2003 | Geier et al. | |
| 6,587,761 B2 | 7/2003 | Kumar | |
| 6,606,542 B2 | 8/2003 | Hauwiller et al. | |
| 6,611,228 B2 | 8/2003 | Toda et al. | |
| 6,611,754 B2 | 8/2003 | Klein | |
| 6,611,755 B1 | 8/2003 | Coffee et al. | |
| 6,622,091 B2 | 9/2003 | Perlmutter et al. | |
| 6,631,916 B1 | 10/2003 | Miller | |
| 6,643,576 B1 | 11/2003 | O'Connor et al. | |
| 6,646,603 B2 | 11/2003 | Dooley et al. | |
| 6,657,875 B2 | 12/2003 | Zeng et al. | |
| 6,671,587 B2 | 12/2003 | Hrovat et al. | |
| 6,688,403 B2 | 2/2004 | Bernhardt et al. | |
| 6,703,973 B1 | 3/2004 | Nichols | |
| 6,711,501 B2* | 3/2004 | McClure et al. | 701/23 |
| 6,721,638 B2 | 4/2004 | Zeitler | |
| 6,728,607 B1 | 4/2004 | Anderson | |
| 6,732,024 B2 | 5/2004 | Rekow et al. | |
| 6,744,404 B1 | 6/2004 | Whitehead et al. | |
| 6,754,584 B2 | 6/2004 | Pinto et al. | |
| 6,774,843 B2 | 8/2004 | Takahashi | |
| 6,792,380 B2 | 9/2004 | Toda | |
| 6,819,269 B2 | 11/2004 | Flick | |
| 6,822,314 B2 | 11/2004 | Beasom | |
| 6,865,465 B2 | 3/2005 | McClure | |
| 6,865,484 B2 | 3/2005 | Miyasaka et al. | |
| 6,900,992 B2 | 5/2005 | Kelly et al. | |
| 6,907,336 B2 | 6/2005 | Gray et al. | |
| 6,922,635 B2 | 7/2005 | Rorabaugh | |
| 6,931,233 B1 | 8/2005 | Tso et al. | |
| 6,934,615 B2 | 8/2005 | Flann et al. | |
| 6,967,538 B2 | 11/2005 | Woo | |
| 6,990,399 B2 | 1/2006 | Hrazdera et al. | |
| 7,006,032 B2 | 2/2006 | King et al. | |
| 7,026,982 B2 | 4/2006 | Toda et al. | |
| 7,027,918 B2 | 4/2006 | Zimmerman et al. | |
| 7,031,725 B2 | 4/2006 | Rorabaugh | |
| 7,089,099 B2 | 8/2006 | Shostak et al. | |
| 7,142,956 B2* | 11/2006 | Heiniger et al. | 701/23 |
| 7,162,348 B2 | 1/2007 | McClure et al. | |
| 7,191,061 B2 | 3/2007 | McKay et al. | |
| 7,221,314 B2 | 5/2007 | Brabec et al. | |
| 7,231,290 B2 | 6/2007 | Steichen et al. | |
| 7,248,211 B2 | 7/2007 | Hatch et al. | |
| 7,256,388 B2 | 8/2007 | Eglington et al. | |
| 7,271,766 B2 | 9/2007 | Zimmerman et al. | |
| 7,277,784 B2 | 10/2007 | Weiss | |
| 7,277,792 B2 | 10/2007 | Overschie | |
| 7,292,186 B2 | 11/2007 | Miller et al. | |
| 7,324,915 B2 | 1/2008 | Altmann et al. | |
| 7,358,896 B2 | 4/2008 | Gradincic et al. | |
| 7,373,231 B2 | 5/2008 | McClure et al. | |
| 7,388,539 B2 | 6/2008 | Whitehead et al. | |
| 7,395,769 B2 | 7/2008 | Jensen | |
| 7,428,259 B2 | 9/2008 | Wang et al. | |
| 7,437,230 B2* | 10/2008 | McClure et al. | 701/50 |
| 7,451,030 B2 | 11/2008 | Eglington et al. | |
| 7,460,942 B2 | 12/2008 | Mailer | |
| 7,479,900 B2 | 1/2009 | Horstemeyer | |
| 7,489,270 B2 | 2/2009 | Lawrence et al. | |
| 7,505,848 B2 | 3/2009 | Flann et al. | |
| 7,522,099 B2 | 4/2009 | Zhodzishsky et al. | |
| 7,522,100 B2 | 4/2009 | Yang et al. | |
| 7,571,029 B2 | 8/2009 | Dai et al. | |
| 7,689,354 B2 | 3/2010 | Heiniger et al. | |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,131,432 B2 | 3/2012 | Senneff et al. | |
| 8,140,223 B2 | 3/2012 | Whitehead et al. | |
| 2003/0014171 A1 | 1/2003 | Ma et al. | |
| 2003/0187560 A1 | 10/2003 | Keller et al. | |
| 2003/0208319 A1 | 11/2003 | Ell et al. | |
| 2004/0039514 A1 | 2/2004 | Steichen et al. | |
| 2004/0212533 A1 | 10/2004 | Whitehead et al. | |
| 2005/0080559 A1 | 4/2005 | Ishibashi et al. | |
| 2005/0225955 A1 | 10/2005 | Grebenkemper et al. | |
| 2005/0265494 A1 | 12/2005 | Goodings | |
| 2006/0167600 A1 | 7/2006 | Nelson et al. | |
| 2006/0178820 A1 | 8/2006 | Eglington et al. | |
| 2006/0178823 A1 | 8/2006 | Eglington et al. | |
| 2006/0215739 A1 | 9/2006 | Williamson et al. | |
| 2007/0032950 A1 | 2/2007 | O'Flanagan et al. | |
| 2007/0078570 A1 | 4/2007 | Dai et al. | |
| 2007/0088447 A1 | 4/2007 | Stothert et al. | |
| 2007/0121708 A1 | 5/2007 | Simpson | |
| 2007/0205940 A1 | 9/2007 | Yang et al. | |
| 2007/0285308 A1 | 12/2007 | Bauregger et al. | |
| 2008/0129586 A1 | 6/2008 | Martin | |
| 2008/0204312 A1 | 8/2008 | Euler | |
| 2008/0269988 A1* | 10/2008 | Feller et al. | 701/41 |
| 2009/0121932 A1 | 5/2009 | Whitehead et al. | |
| 2009/0171583 A1 | 7/2009 | DiEsposti | |
| 2009/0174597 A1 | 7/2009 | DiLellio et al. | |
| 2009/0174622 A1 | 7/2009 | Kanou | |
| 2009/0177395 A1 | 7/2009 | Stelpstra | |
| 2009/0177399 A1 | 7/2009 | Park et al. | |

(56) References Cited

U.S. PATENT DOCUMENTS

| | | |
|---|---|---|
| 2009/0204281 A1 | 8/2009 | McClure et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik et al. |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0312428 A1 | 12/2010 | Roberge et al. |
| 2011/0015817 A1 | 1/2011 | Reeve |
| 2011/0018765 A1 | 1/2011 | Whitehead et al. |
| 2011/0054729 A1 | 3/2011 | Whitehead et al. |
| 2011/0118938 A1 | 5/2011 | MacDonald et al. |
| 2011/0172887 A1 | 7/2011 | Reeve et al. |
| 2011/0196565 A1 | 8/2011 | Collins et al. |
| 2011/0224873 A1 | 9/2011 | Reeve et al. |
| 2011/0231061 A1 | 9/2011 | Reeve et al. |
| 2011/0257850 A1 | 10/2011 | Reeve et al. |
| 2011/0264307 A1 | 10/2011 | Guyette et al. |
| 2011/0270495 A1 | 11/2011 | Knapp |
| 2012/0127032 A1 | 5/2012 | McClure |
| 2012/0174445 A1 | 7/2012 | Jones et al. |

FOREIGN PATENT DOCUMENTS

| | | |
|---|---|---|
| JP | 07244150 | 9/1995 |
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |
| WO | WO-2010005945 | 1/2010 |
| WO | WO-2011014431 | 2/2011 |

OTHER PUBLICATIONS

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509, (Apr. 20, 2010).

"International Preliminary Report on Patentability and Written Opinion", PCT/US2009/060668, (Apr. 28, 2011).

"International Preliminary Report on Patentability and Written Opinion", PCT/US2004/015677, (Nov. 21, 2006).

"International Preliminary Report on Patentability and Written Opinion", PCT/US2010/042770, (Jan. 24, 2012).

"International Search Report and Written Opinion", PCT/US2010/042770, (Sep. 15, 2010), 1-11.

"International Search Report", PCT/US2004/015677, (Jan. 26, 2005).

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics Inc., (May 2004),136-143.

Xu , Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3 No. 1 pp. 5-12 (1999) John Wiley & Sons, Inc.

Park, Chansik et al., "Integer Ambiguity Resolution for GPS Based Attitude Determination System", *SICE*, Jul. 29-31, 1998, Chiba, 1115-1120.

Last, J. D., et al., "Effect of skywave interference on coverage of radiobeacon DGPS stations", *IEEE Proc.-Radar, Sonar Navig.*, vol. 144, No, 3. Jun. 1997, pp. 163-168.

"International Search Report and Written Opinion", PCT/US2004/015678, filed May 17, 2004, Jun. 21, 2005.

"ISO", *11783 Part 7 Draft Amendment 1 Annex*, Paragraphs B.6 and B.7 ISO 11783-7 2004 DAM1, ISO: Mar. 8, 2004.

Kaplan, E D., "Understanding GPS: Principles and Applications", *Artech House*, MA 1996.

Irsigler, M et al., "PPL Tracking Performance in the Presence of Oscillator Phase Noise", *GPS Solutions*, vol. 5. No. 4, pp. 45-57 (2002).

Ward, Phillip W., "Performance Comparisons Between FLL, PLL and a Novel FLL-Assisted-PLL Carrier Tracking Loop Under RF (56) References Cited

OTHER PUBLICATIONS

Interference Conditions", *11th Int. Tech Meeting of the Satellite Dlvision of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*. vol. 25, (Jan. 200), 169-194.

Takac, Frank et al., "SmartRTK: A Novel Method of Processing Standardised RTCM Network RTK Information For High Precision Positioning", *Proceedings of ENC GNSS 2008*, Toulouse, France,(Apr. 22, 2008).

"International Search Report", PCT/US09/33567, (Feb. 9, 2009).
"International Search Report", PCT/US09/49776 (Aug. 11, 2009).
"International Search Report", PCT/AU/2008/000002, (Feb. 28, 2008).
"International Search Report and Written Opinion", PCT/IB2008/003796,, (Jul. 15, 2009).
"International Search Report", PCT/US09/33693. (Mar. 30, 2009).
"International Search Report", PCT/US09/039686 (May 26, 2009).
"International Search Report", PCT/US09/34376, (Nov. 2, 2009).
"International Search Report / Written Opinion", PCT/US09/63594, (Jan. 11, 2010).
"International Search Report", PCT/US09/60668, (Dec. 9, 2009).
"International Search Report and Written Opinion", PCT/US10/21334, (Mar. 12, 2010).

\* cited by examiner

GNSS CONTOUR GUIDANCE PATH SELECTION

BACKGROUND OF THE INVENTION

1. Field of the Invention

The present invention relates generally to vehicle guidance, and in particular to a system and method for global navigation satellite system (GNSS) based positioning, guidance and automatic steering allowing a user to lock onto and guide a vehicle in real time along one particular guidance path of choice, which may deviate from an initial or pre-planned guidance route, while ignoring other possible guidance paths.

2. Description of the Related Art

In the field of vehicle guidance and navigation, GNSS technology, including the Global Positioning System (GPS), has enabled a wide range of applications. For example, various GNSS receivers are available for aviation, marine and terrestrial vehicles. The GNSS information provided by such receivers can be processed and used for navigation. In more sophisticated systems, vehicle guidance can be automatically controlled using such information. For example, a predetermined travel or flight path can be programmed into an on-board computer. The vehicle guidance system can automatically maintain appropriate navigation parameters, such as course, heading, speed, altitude, etc. Control system, feedback theory and signal filtering techniques can be used to interactively anticipate (with higher order systems) and compensate for course deviations and navigation errors. Such sophisticated autopilot and automatic steering systems include computers and automated flight and steering controls integrated with manual controls.

Accurate vehicle and equipment guidance is an important objective in agriculture. For example, cultivating, tilling, planting, spraying, fertilizing, harvesting and other farming operations typically involve specialized equipment and materials, which are operated and applied by making multiple passes over cultivated fields. Ideally, the equipment is guided through accurately-spaced passes or swaths, the spacing of which is determined by the swath width of the equipment. Gaps and overlaps can occur when operators deviate from the ideal guide paths, resulting in under-coverage and over-coverage respectively. Such gaps and overlaps are detrimental to agricultural operations and can reduce crop yields. For example, gaps in coverage reduce the effective areas of fields being cultivated and treated. Overall crop production may suffer as a result. Overlaps in coverage tend to be inefficient and wasteful of materials, such as fertilizer, pesticides, herbicides, seed and fuel. Another potential problem with overlapping coverage relates to the potentially crop-damaging effects of double applications of certain agricultural chemicals.

Accurate positioning and guidance are also important in other fields, such as machine control and earth working. Controlling a vehicle's movement as well as its actual job function is important in operations such as trench digging and material hauling. Defining vehicle paths up narrow work roads in a strip mining installation, for instance, can help avoid vehicle collisions and improve safety. Guidance in almost any industrial or agricultural industry can benefit from improved guidance.

Previous mechanical systems for assisting with the guidance of agricultural equipment include foam markers, which deposit foam along the swath edges. The foam lines produced by foam markers provide operators with visible reference lines on which subsequent passes can be aligned. However, foam marking systems consume foam-making materials and provide only temporary foam marks. Moreover, guiding along such foam lines requires the operators to visually estimate the locations of the implement ends relative to the foam lines. Implements such as spray booms can span 50 feet or more, thus increasing the difficulties associated with visually aligning distant, elevated boom ends with foam lines on the ground.

Vehicles and their operators are often provided with guidance instructions from a GNSS system which receives satellite and optional local real-time kinematic (RTK) signals and translates them into a triangulated position of the vehicle in question. Depending on the GNSS system, the accuracy of a particular vehicle's position can be determined at sub-centimeter level accuracy. Systems exist that allow end users to create pre-planned guidance paths through a field or to base such a path off of a first swath within the field; however, these systems are limited to follow the paths set for them or established by a single initial row unless the user decides to manually guide the vehicle without the use of GNSS guidance for the remainder of a working period.

GNSS-based guidance is a popular and widely-used method for providing vehicle guidance today. GNSS guidance employs several different techniques to allow for optimum automated guidance of a vehicle while it is performing its job. Such guidance options include straight line A-to-B guidance, guidance based on a previous swath, or guidance based on a preplanned guide path. A more recent method for vehicle guidance utilizes a contour path or "curvature" path to guide a vehicle along complex field boundaries or in areas of widely ranging and sloping elevation. The methods of U.S. Pat. No. 7,437,230, which is incorporated herein by reference, provide a unique and useful approach to compute guidance paths based on curvature using a minimum turning radius upon which to base the allowable curve of a path.

Previous GNSS guidance systems lacking the ability to reconfigure the guidance path on-the-fly (i.e., in real-time) tended to restrict vehicle guidance to whatever pre-planned path was developed prior to the vehicle being put to work. If the vehicle operator determines that the pre-planned path is not ideal while actually working the vehicle, it is difficult to change the system to use a new guidance path. The reason for this is that many previous guidance systems, such as the Outback S3 GNSS guidance system by Hemisphere GPS LLC of Calgary, Alberta, Canada, are constantly searching for guidance points in a field or a work area. When they find a guidance point they instruct the operator or auto-steer function to follow the located guidance path. This can cause the guidance system to become confused and misguide the vehicle when one guidance path crosses another guidance path. Previously there has not been a method or system allowing a GNSS-based guidance system to ignore all but a single guidance path with the advantages and features of the present invention.

SUMMARY OF THE INVENTION

In the practice of an aspect of the present invention, a vehicle equipped with and guided by a typical GNSS guidance system is driven along a preplanned path. The vehicle is also equipped with a guidance path-lock system capable of establishing and locking onto a single guidance path and ignoring all other guide paths. The vehicle can follow either the preplanned path or, at the option of the operator, be set and locked to follow a new path based off of a previous swath that can be straight or contoured depending on the terrain and the operator's preference.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

A preferred embodiment of the present invention uses a GNSS guidance system to provide an initial path. The initial path may be based off of preplanned maps entered into the system's memory, or off of an initial swath taken by the vehicle, or by any method feasible for establishing a typical GNSS guidance map. From this point, however, the present invention will enable the operator of the vehicle to stop using the original guidance path and to create a new guidance path, while still recognizing the original guidance path points so that the operator can choose to return to the original path at any time.

Figure 1:
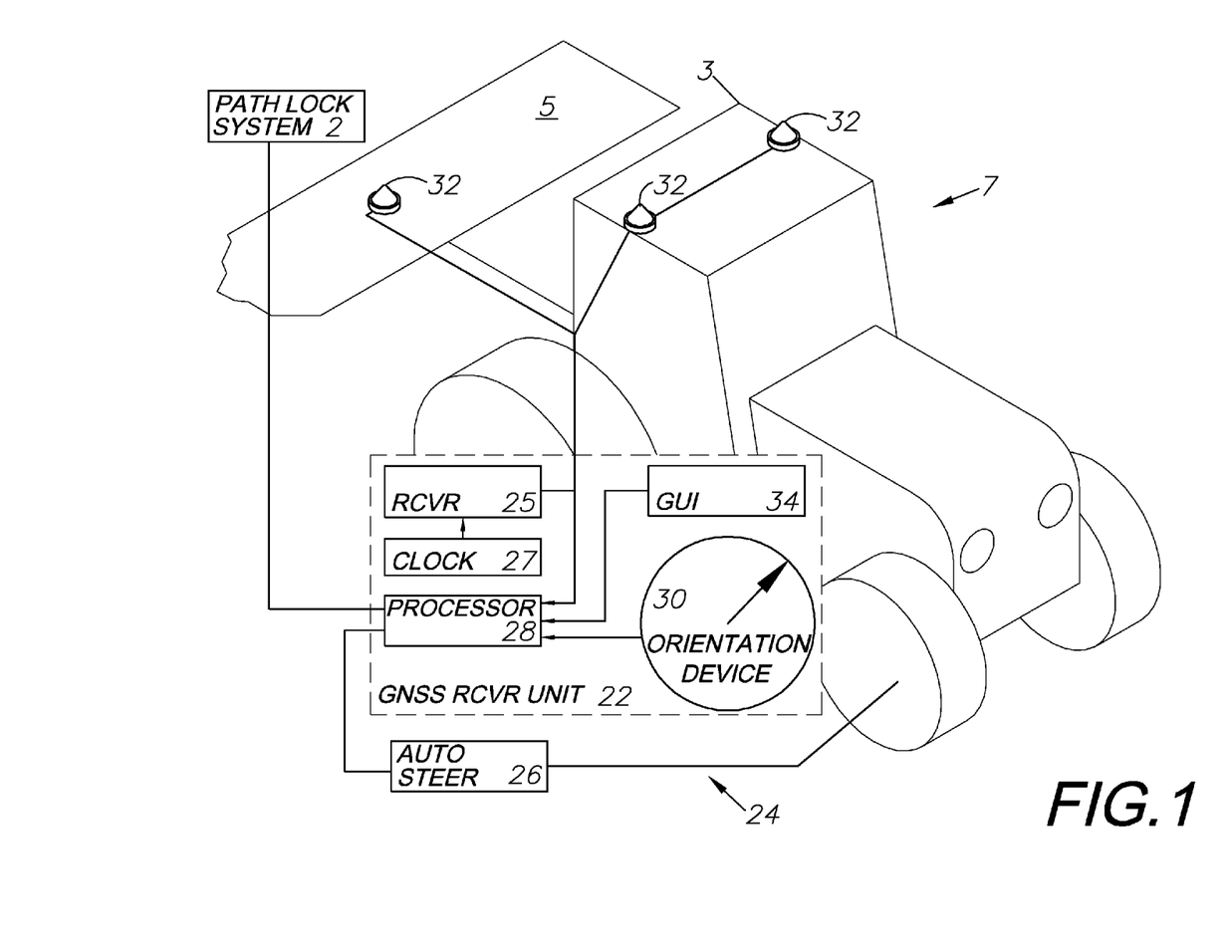
FIG. 1 is an isometric view of an agricultural vehicle comprising a tractor connected to an implement and equipped with a GNSS guidance system with a contour path locking ("contour lock") subsystem embodying an aspect of the present invention.

Referring to the drawings in more detail, FIG. 1 shows an agricultural vehicle 7 comprising a tractor 3 connected to an implement 5 and equipped with a GNSS guidance system 24 including a contour lock subsystem 2 embodying an aspect of the present invention. The guidance system 24 includes an automatic steering ("autosteer") subsystem 26 in a preferred embodiment. Such an automatic steering subsystem 26 is similar to that described in U.S. Pat. No. 7,142,956, which is incorporated herein by reference. The GNSS guidance system 24 comprises a GNSS receiver unit 22 and at least one antenna 32 mounted on the tractor 3. The GNSS receiver unit 22 is further comprised of a receiver 25, a clock 27, a processor 28, an orientation device 30, and a graphical user interface (GUI) 34. The guidance system processor 28 is either uploaded with a pre-planned path for the vehicle to traverse while working, or is configured to create a series of guidance paths by storing GNSS data points during swaths off of the position points of previous swaths.

II. Contour Lock Subsystem 2

A guidance path locking (contour lock) subsystem 2 is also installed on the tractor 3 or other suitable vehicle and in direct connection with the GNSS processor 28. The path locking system 2 is capable of establishing new GNSS guidance paths on-the-fly (i.e., in real time) at the control of the vehicle operator while the GNSS processor 28 continues to store the pre-planned path or prior GNSS path information so that the operator can choose to exit the path locking subsystem 2 and return to the original guidance pattern. In a preferred embodiment, the path locking system 2 is controlled via user interface at the GUI 34 of the GNSS guidance system 24. The GUI 34 can include any suitable display device, such as a monitor or an LED display. The GUI can include any suitable input device, such as a keypad, a keyboard, a touch screen, a wireless remote control, a tracking ball, a mouse, etc.

FIGS. 2A through 2E show plan views of a field 4 as viewed on a GUI within screen borders 6 being worked by a tractor 3 towing an implement 5 (collectively a vehicle 7) using the contour path locking subsystem 2 of the present invention. FIGS. 2A-E represent a progression of a field-working vehicle 7 as it initially follows A-B point rows in FIG. 2A, deviates from these point rows and initiates the Contour Lock mode of the path locking system 2 in FIG. 2B, locks onto the deviated path pattern in FIGS. 2C and D, and finally breaks from the locked path in FIG. 2E. The GUI display 34 denotes various path-following modes via screen items 79, 80, 82, 84 in the upper right-hand corners of the display 34. Also present on the GUI display is an on-screen steering guide 36. The steering guide 36 alerts the driver of the vehicle 7 when the vehicle has deviated from the path that the guidance system is following. The steering guide 36 is similar to that described in U.S. Pat. Nos. 6,539,303 and 6,711,501, which are incorporated herein by reference. The steering guide 36 indicates to the vehicle 7 operator how far off of the desired path the vehicle is. An upper steering guide arc 42 indicates the angle at which the vehicle is turned askew from the desired path in degrees, and a lower steering guide bar 44 indicates the distance the vehicle is offset left or right of the desired path. Using the steering guide 36 a vehicle operator can manually guide the vehicle 7 back onto the desired path instead of relying on an autosteer mechanism.

Figure 2A:
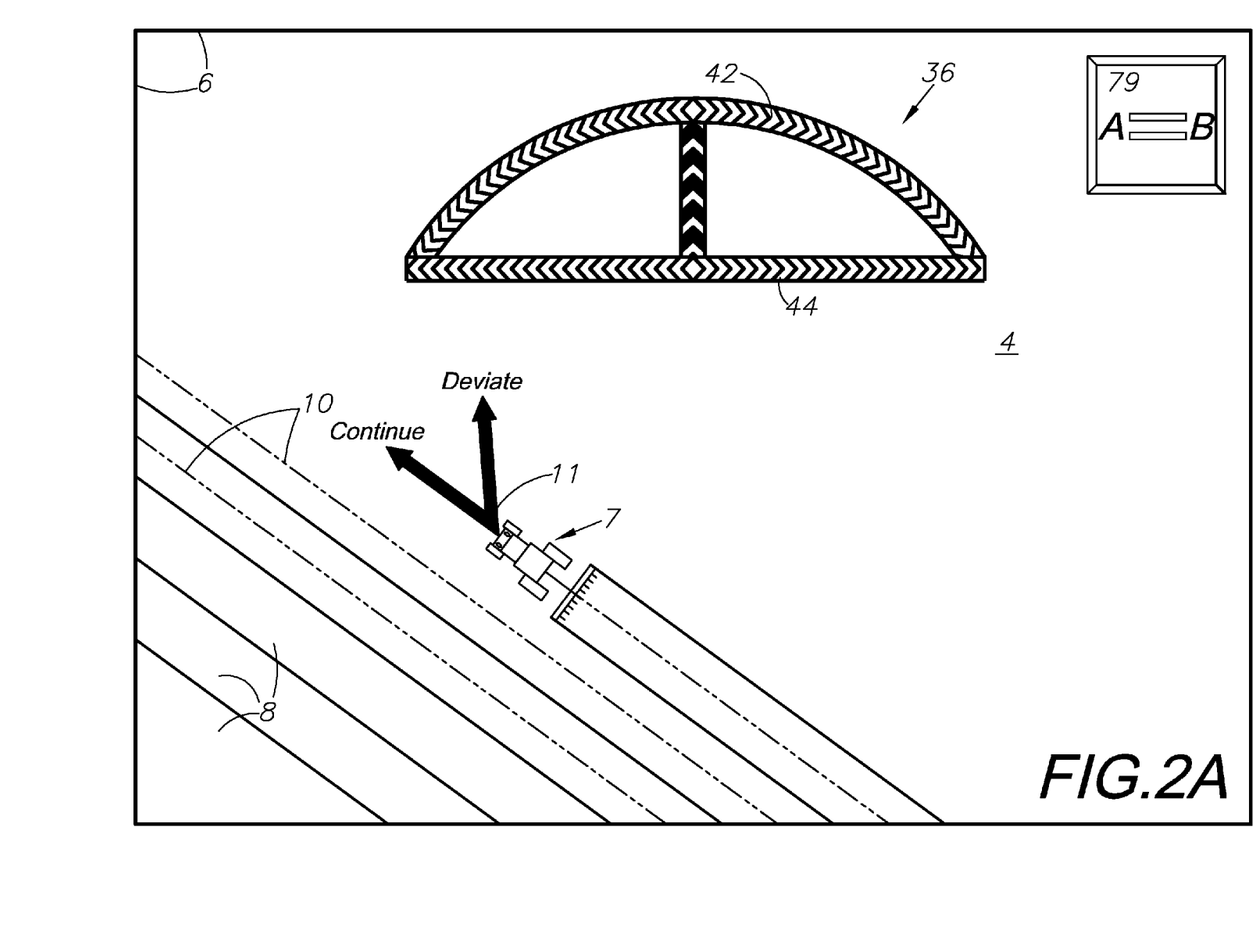
FIGS. 2A-E show a display produced by the contour lock subsystem and associated with various guidance conditions in a cultivated field, including various swath patterns.

FIG. 2A demonstrates a vehicle in A-B point row path guidance performing point row swaths on a field 4. Initial swaths 8 are based off of either a pre-planned guide path or an initial swath manually driven, after which each successive swath is modeled and guided by the GNSS guidance system 24. The GNSS system 24 is programmed to constantly search for the closest swath 8 to guide off of. The GNSS guidance system 24 uses a center guideline 10 to establish where the tractor 3 has traveled or will travel, but could be programmed to guide to one or both of the swath edges, each associated with a respective end of the implement 5.

Figure 2B:
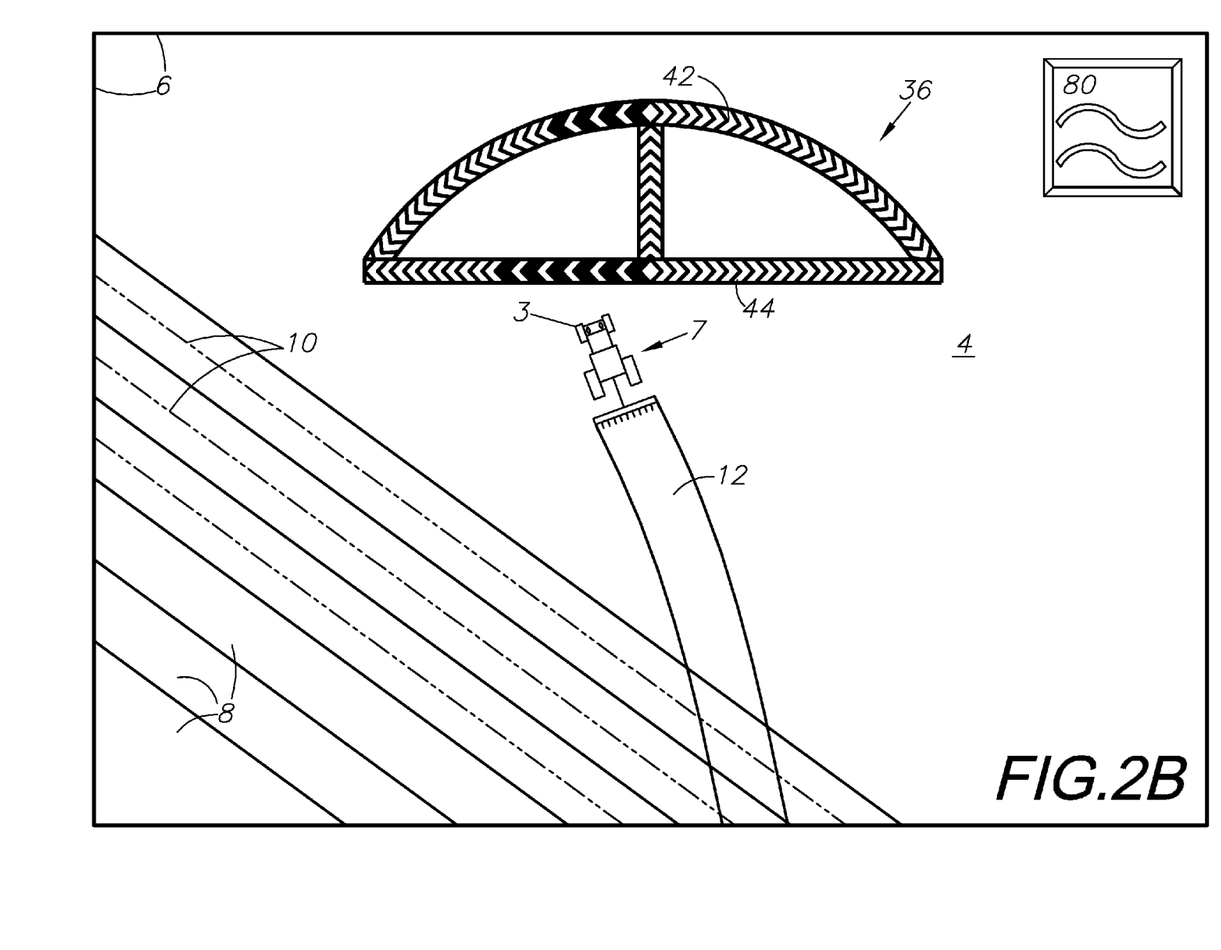

As the vehicle is following the A-B point row pre-planned paths 10, as denoted on-screen by an A-B guidance mode symbol 79, it may at any point choose to continue following the pre-planned path, or deviate from that path, as denoted by the decision arrows 11. FIG. 2B demonstrates a vehicle as it deviates from the pre-planned path 10 and initiates the contour-tracking mode as denoted on screen by a contour guidance mode symbol or screen item 80. The tractor follows the deviated path 12, and the guidance system 24 records the path as traveled by the vehicle 7 and stores that position information in the memory of the processor 28. The processor will then establish guideline paths 14, as shown in FIGS. 2C and D, based on the deviated contour path 12.

Figure 2C:
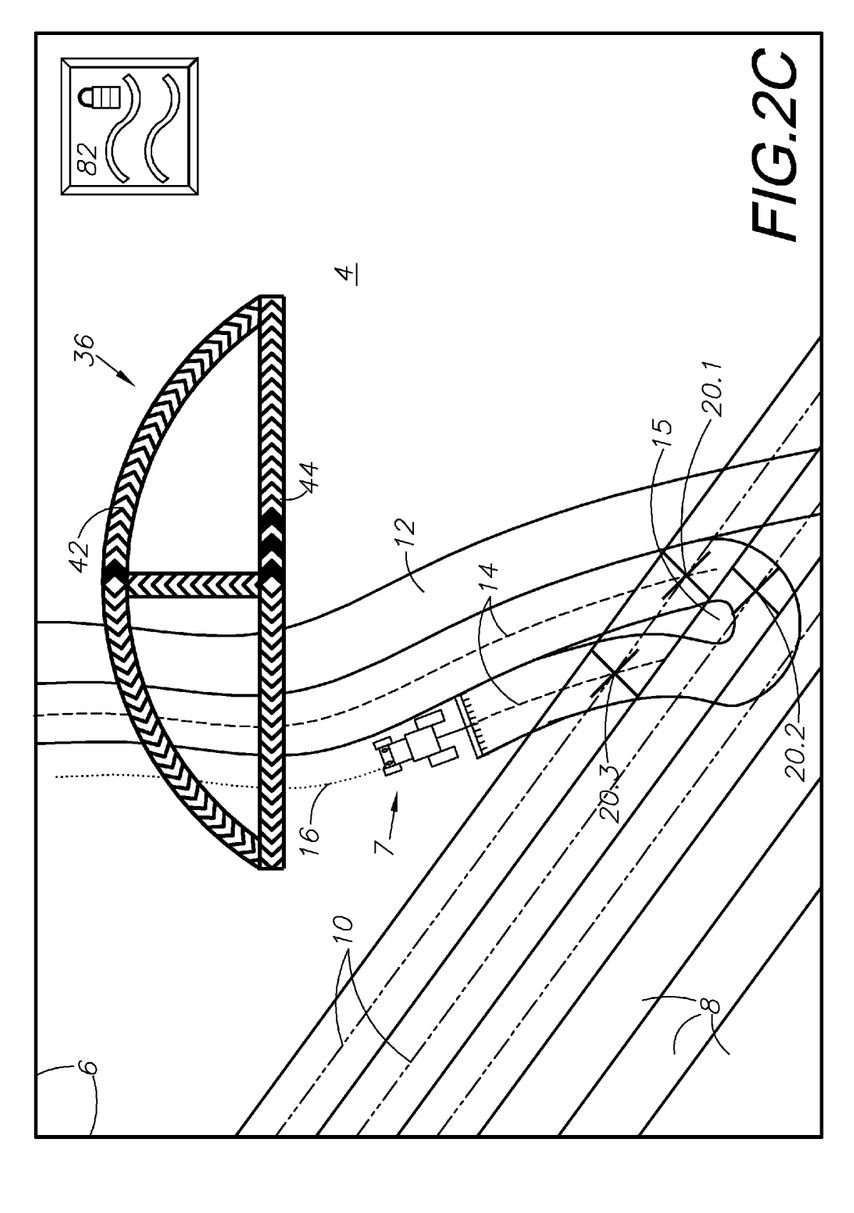
Figure 2D:
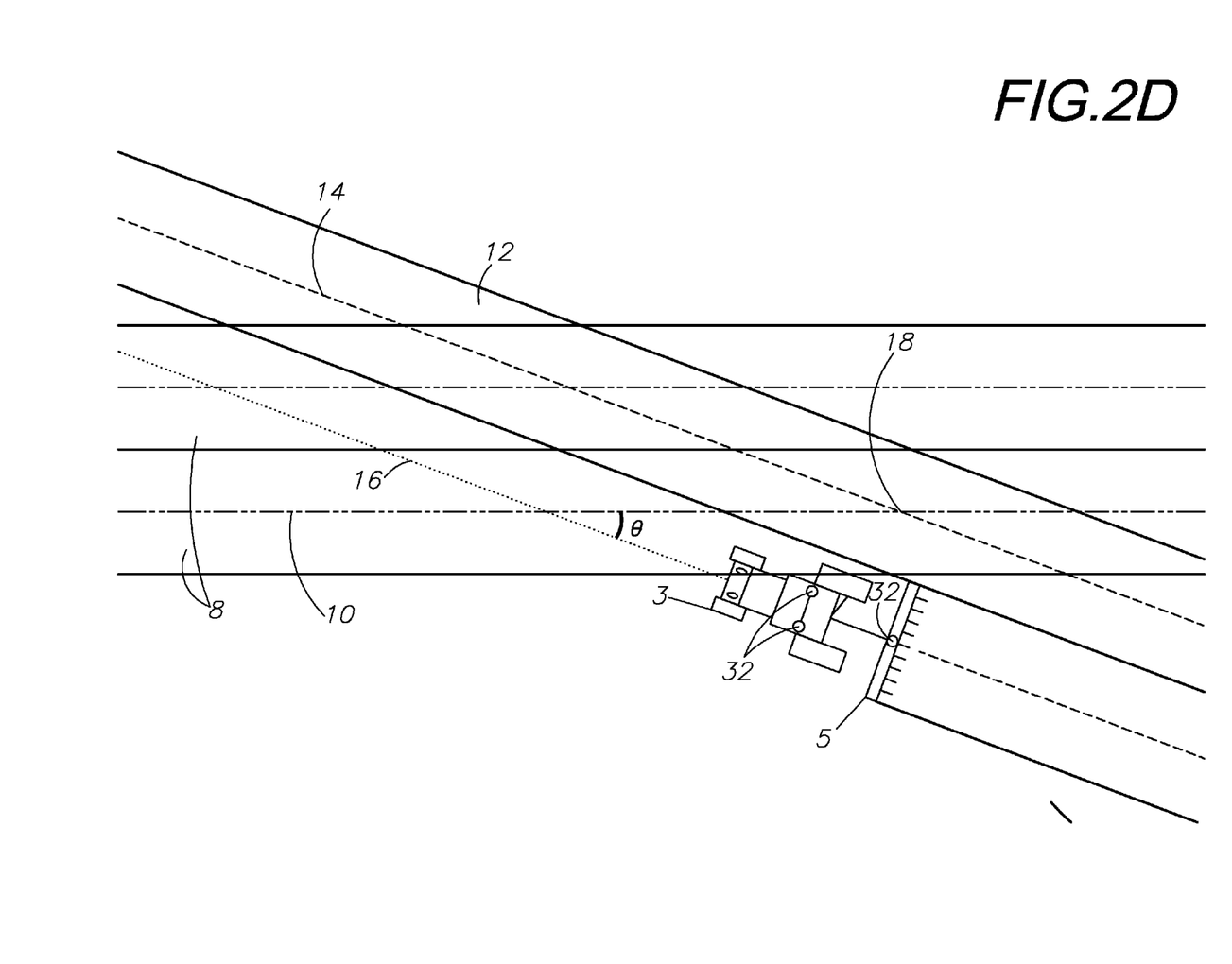

In FIGS. 2C and D, the vehicle 7 has entered into the Contour Lock mode as denoted by the symbol 82. The operator of the vehicle 7 can activate the path locking system 2 ("Contour Lock On") via any suitable input switch interface, such as a touch screen graphical user interface (GUI) 34 connected to the processor 28. The operator can steer a deviated path 12 away from the guidance lines 10, which were automatically created by the GNSS system 24. After the operator drives the deviated path 12, the path locking system 2, through the GNSS guidance system processor 28, will lock the guidance system 24 onto a guideline 14 defined by a swath-width offset from the adjacent swath guideline 14. Such guideline generating algorithms using swath widths (generally represented by the implement 5 width) as offsets are disclosed in U.S. Pat. Nos. 6,539,303 and 6,711,501 as mentioned above and which are incorporated herein by reference. With the Contour Lock mode active, the GNSS guidance system 24 will cease searching for new swaths and ignore all other guidance information. The system 2 will then lock on this new guideline 14 based off of the deviated path 12, and will then guide to or drive (with autosteer 26 on) the guideline 14. The system projects a future guideline 16 based on the deviated path of which the tractor will follow until the system vehicle 7 deviates from this locked guideline 14.

Figure 2E:
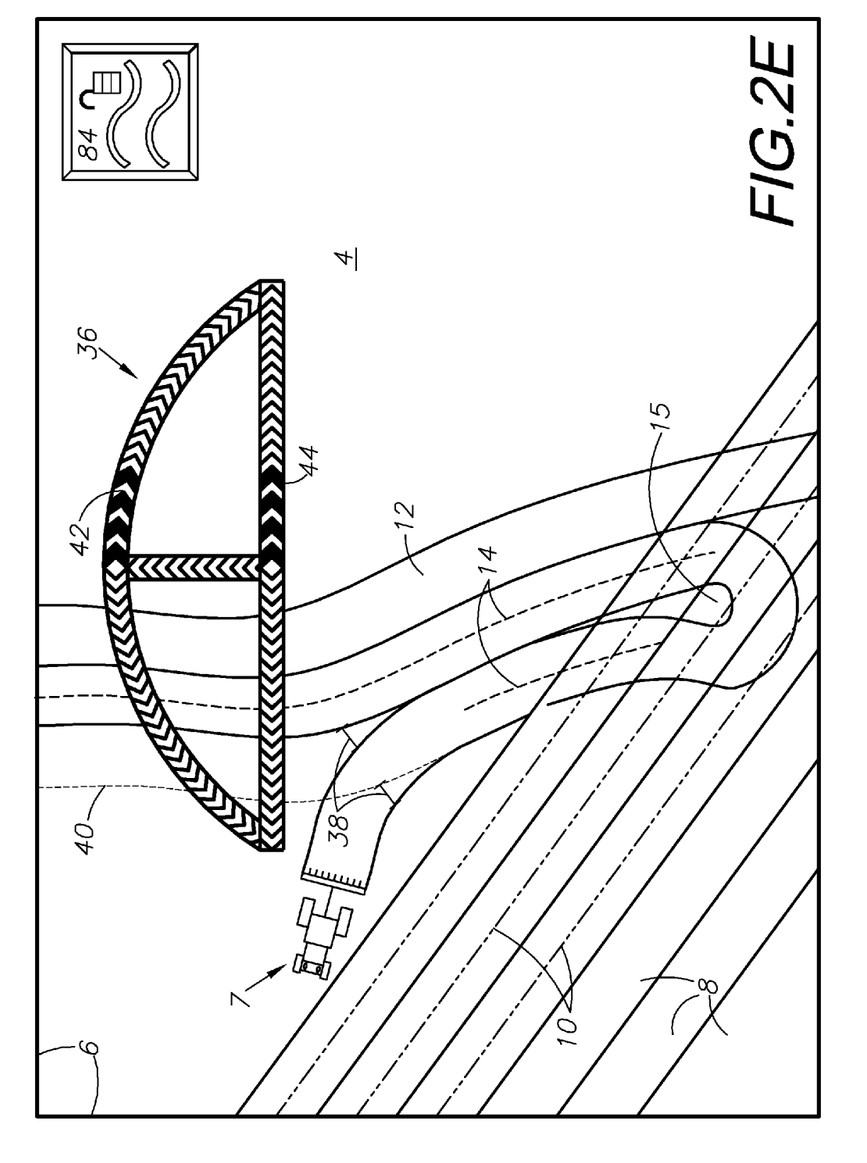

The path lock system 2 will stay engaged and locked in Contour Lock mode onto the desired path until the vehicle deviates from the locked guideline 14 by a predetermined amount, e.g. an offset of 2 meters or an angular deviation of 10%, resulting in a cross-track error 38 as demonstrated in FIG. 2E. Such disengaging cross-track errors 38 could be adjustable by the operator and/or include preprogrammed default deviation threshold conditions. The deviation could occur either with the operator intentionally steering the tractor 3 away from the deviated path 12 or because of uneven terrain or other irregularities that cause the vehicle 7 to become misaligned from the projected locked path 16. The contour lock subsystem 2 will then disengage and unlock and begin searching for the nearest swath again, and may pick up any previous swath, either preplanned 8 or deviated 12. The operator will guide the vehicle along a new guidance line, and after a specific period following the same guide line the system 2 can reengage and lock onto whichever guideline 10, 14 is chosen by the operator.

FIG. 2D shows an enlarged, fragmentary view of the vehicle 7 in the field 4 as previously shown in FIG. 2C. FIG. 2D shows intersection points 18 where the guidance system 24 could encounter ambiguity over which direction to guide the vehicle, i.e., initial guideline 10 or new guideline 14. At an intersection 18 of guidelines 10, 14, the tractor 3 ("Contour Lock" mode on) is still following the locked path 14 and has not diverted, so the system 2 will ignore the prior pre-planned guide path 10 on crossing. A keyhole turn 15 whereat the vehicle 7 reverses direction is shown in FIG. 2C. Because of the widths of typical implements 5, the operator would typically swing wide, first turning away from the desired turning direction in order to establish a sufficiently large turning radius to accommodate the implement 5, thus forming a keyhole-shaped turn (FIG. 2B). However, as the operator turns the vehicle 7 and deviations exceed 2 meters or 10% from the locked path, the system 2 will unlock its Contour Lock mode and the guidance system 24 may try to guide the vehicle onto a number of paths, as shown as intersecting the current path at 20.1, 20.2, and 20.3 in FIG. 2C. The operator has the option of continuing with the deviated path 16 or to going back to guiding on a pre-planned path 10.

It should be noted that when the vehicle deviates from the preplanned path, but the system 2 is not placed in Contour Lock mode, the guidance system 24 will only pick up a different path if it is at a very small angle relative to the path currently being followed. For instance, if the vehicle 7 has at one time exited the field 4 for some reasons at a perpendicular 90 degree angle to the preplanned paths, the guidance system 24 will ignore those recorded perpendicular guidance paths when the vehicle 7 returns to traveling the preplanned guidance path. The guidance system in Contour Mode or A-B path-find mode will only deviate from the currently guided path when deviations are at small angles (close or parallel) to the path being traveled. Contour Lock mode will prevent the guidance system from picking up these small deviations. Such a small-angle path crossing is represented by $\theta$ in FIG. 2D. As the current path 16 approaches the pre-planned or point row path 10, the guidance system 24 without Contour Lock mode engaged may direct the vehicle 7 to follow the pre-planned or point row path 10. Contour Lock mode directs the guidance system 24 to ignore these deviating paths and follow new path 16, which is defined by a swath-width, parallel offset from locked path 14.

After the operator chooses a path, he or she then drives (or allows the autosteer function to operate the tractor 3) in that direction and the guidance system 24 will continue searching for guidance paths 10. After several moments of the tractor 3 being manually guided along one path, the system 2 will pick up on that uniform path and once again lock to it, creating a new projected locked path 16.

III. Guidance Path Locking Method

Figure 3:
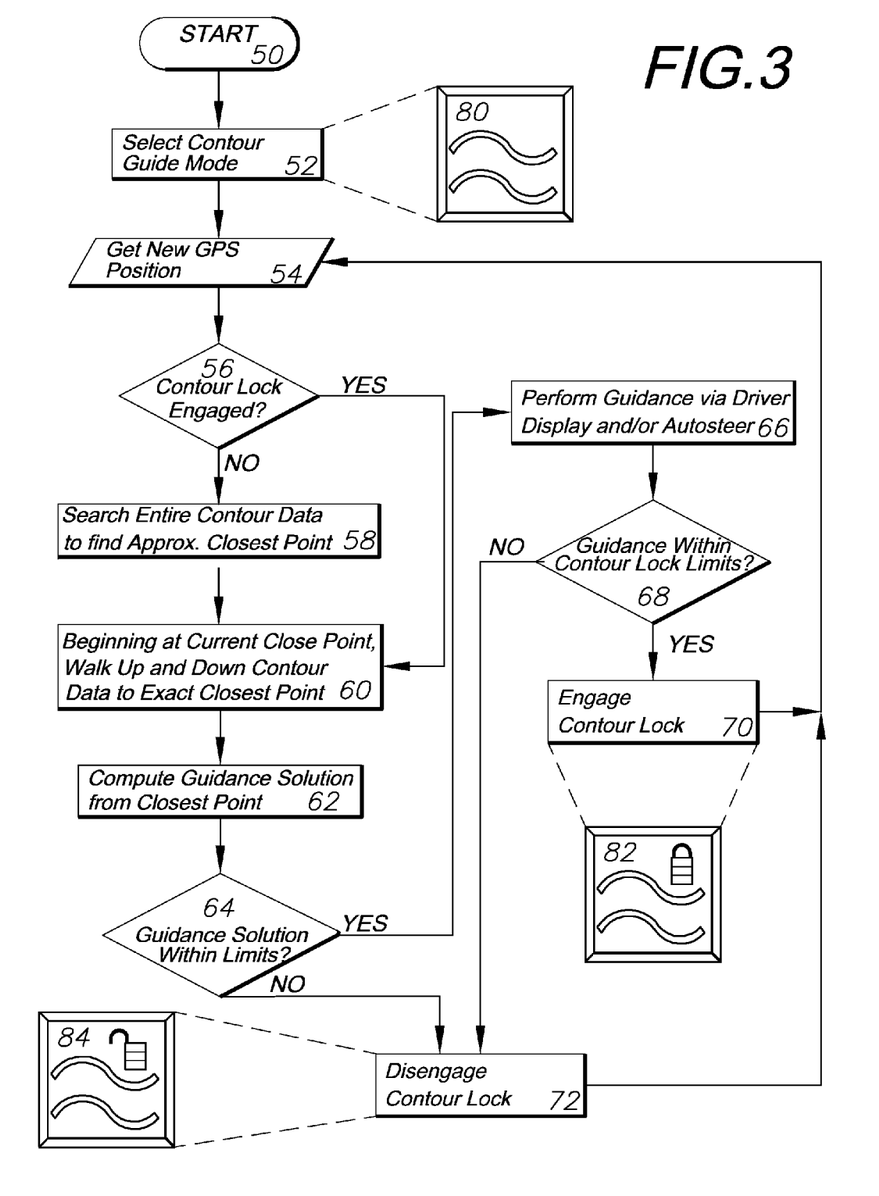
FIG. 3 is a flowchart demonstrating the steps taken to perform the contour lock method of the present invention utilizing the GNSS guidance system.

FIG. 3 is a flow chart showing a method embodying an aspect of the present invention. The general steps taken while practicing a method of a preferred embodiment of the present invention are shown and described as follows, although the method of the present invention could involve other steps in other sequences.

The method starts at 50. The vehicle and guidance systems are initialized and the user will select to enter Contour Guide Mode at 52. This will result in the path lock symbol 80 appearing on the GUI 34 indicating that the path lock system 2 is on and searching for contour paths, but is not yet engaged. The guidance system 24 will obtain a new GPS position at 54 and then perform a check at 56 to determine whether contour lock as been engaged.

If contour lock has not been engaged, the guidance system 24 will perform a search of the entire list of contour data received by the guidance system and find the approximate closest point at 58 to the current vehicle position. Once the approximate closest point has been found, or if the answer to the check at 56 is "yes," the guidance system 24 will begin at the current closest point as received, and then walk up and down the list of collected contour data to locate the exact closest point at 60. From here, the guidance solution will be computed by this closest point at 62. Using the solved closest point, the guidance system 24 will guide the vehicle 7 along the best-fit contour path based on the "closest point" method defined above.

Next a series of checks are performed to determine whether to engage the contour lock mode. First, the guidance system 24 will determine whether the computed guidance solution is within predetermined limits for locking onto a guidance path at 64. For instance, if the computed guidance path is at an angle greater than 50 degrees relative to the currently traveled path, the guidance system may selectively ignore that guidance path as outside of these limits. If the computed guidance solution is not within proper contour lock limits, the contour lock will remain disengaged at 72 and a new GPS position will be determined at 54.

If the original guidance solution is determined to be within the determined limits at 64, then the guidance system will perform guidance functions at 66. This guidance can either be visually through a display unit in the cabin directing a human user where to steer the vehicle 7, or it may be through the operation of an autosteer system 26. The guidance system 24 will guide the vehicle 7 along the chosen contour path while performing a check to determine whether the guidance is within the contour lock limits at 68. These limits include determining whether the vehicle 7 has deviated from the contour path by more than two meters or ten percent of the swath width. If the vehicle does not pass the check at 68, contour lock will disengage at 72 and the guidance system 24 will find a new GPS location 54 and begin the process anew. When the lock is disengaged at 72, the GUI 34 will display the disengaged lock symbol screen item 84 on screen 34 (FIG. 2E).

If the guidance system 24 determines that the guidance check at 68 is within the limits required by the contour lock system 2, the contour lock mode will engage at 70, and the locked symbol screen item 82 will appear onscreen of the GUI 34 (FIG. 2C) indicating to the vehicle operator that the system is currently locked to the detected contour path and the guidance system 24 will ignore all other paths.

The contour lock method loops back to step 54 where the GPS position determination is made, and the loop repeats. Depending on whether contour lock is engaged at 70 or disengaged at 72, the check at 56 will return a "yes" or "no" result. Generally if the contour lock is engaged, it will remain engaged until the checks at 64 or 68 result in a "no" result. This outcome can either be the result of the vehicle accidentally leaving the tracked contour path by a certain margin, or by the vehicle user intentionally disengaging the contour lock mode by steering the vehicle 7 off the guidance path. This could be because the user desires to turn the vehicle 7 around and follow a parallel path across the field, to avoid an obstacle, or for any other conceivable reason. The process will then restart until the guidance system 24 locates and guides the vehicle along a new guidance path, and the contour lock system 2 locks onto that path.

IV. Guidance as a Macro

Another use for the present invention is macro-programming automation systems in vehicles, e.g., in the earth working industry. Earth working often requires an operator to make repetitive "cut" and "fill" actions, such as cutting trenches or hauling and dumping material. These machines could be programmed with a pattern of motion called a macro to be repeated several times. The repetition can be triggered on operator command or by an auto-engage criteria similar to existing steering auto-engage logic on GNSS guidance systems such as those made by Hemisphere GPS LLC of Calgary, Alberta, Canada. The purpose of such macros is to reduce operator workload while increasing precision and machine throughput.

A macro program may be along an absolute 2D or 3D GPS location, or may be relative to the machine position. In an earth works backhoe operation, the bucket may be programmed to make a digging motion, then retract from the ditch, deposit the dirt relative to the machine and repeat. Subsequent repeats may move along a ditch and deposit the dirt along a line. The machine operator may control how the absolute macro path moves in a numeric fashion on a user interface, or may "nudge" the motion in a particular direction using a physical control handle that adjusts the subsequent operation of the macro repeats. An entire ditch could be dug with a single macro, where each repetition was adjusted by the operator using analog or digital inputs according to the difficulty of the job. A similar macro could be used by an earth moving machine where the path was adjusted downward or upward from an absolute 3D position on each succeeding repetition that had the cumulative effect of moving soil from one location to another.

Such a macro program may be open or closed, and may be direction dependent or free to be set to any direction specified. The differences arising from these alternative macro types reside in the program limitations of each macro. For example, a closed macro is based on a more limited set of programmed instructions and does not allows for a wide variety of use; whereas an open macro will be more flexible and may be suited to a wide variety of circumstances. Though more limited in its uses, the closed macro will likely be able to perform more detailed, specialized tasks.

Likewise some pieces of equipment may be more suited to directional macro programming than free macro programming. A prime example of this is a mining truck which must perform one task when traveling one direction up or down a specific path, and another function when traveling the opposite direction. The ideal macro in such a situation is a directional, closed macro limiting the vehicle to a specific and repetitive path where one action (e.g. material pickup) is performed after traveling down a mine road, and another action (e.g. material unloading) is performed after traveling the opposite direction.

The preferred embodiment of the present invention can utilize all of these macro program variations to perform a number of repetitive, complicated tasks in a variety of fields. The path lock system 2 would be valuable to the formation of such macros, as the guidance system could effectively be taught not to track or guide along other reference paths except for the single path desired for a particular job. Several jobs could be recorded into one system and the path lock system could be used to choose between the jobs, whereby all other job guidance references are ignored. Without such a device each piece of equipment would either be limited to the storage of one job function at a time, or would run the risk of the guidance system attempting to guide the vehicle along a path different than the desired work path.

V. Conclusion

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A GNSS guidance method using a GNSS guidance system attached to a vehicle towing an implement, the guidance system including a GNSS receiver, at least one GNSS antenna, a processor, and a memory storage device, the method performed by the processor, comprising the steps of:
uploading a pre-planned guidance path solution or creating a guidance path solution by storing GNSS data points;
storing said guidance path solution as a first guidance path solution;
guiding the vehicle along said first guidance path solution;

receiving with the antenna and the receiver GNSS position information from a plurality of GNSS positional satellites;

recording with the processor current position information received into the memory storage device and storing it as previous swath data corresponding to said first guidance path solution;

deviating from said first guidance path solution;

engaging a guidance isolation contour lock mode for the swath guidance path solution currently being guided along if the vehicle is guided along the same path for a predetermined amount of time, resulting in a contour lock function ignoring said first guidance solution guidance swaths and computing a second guidance solution path including an isolated guidance contour lock path adapted for use in said isolated guidance contour lock mode;

guiding said vehicle along said second guidance solution path in said isolated guidance contour lock mode;

repeatedly computing a GNSS position of said vehicle while guiding said vehicle along said second guidance solution path;

disengaging said contour lock function in said guidance isolation contour lock mode if said vehicle deviates from said second guidance solution path by greater than a predetermined deviation comprising either a predetermined distance or a predetermined percentage of the width of the guidance path;

in said isolated guidance mode with said contour lock function disengaged, locking onto a guidance path from either the first or second guidance solution;

with contour lock engaged, ignoring said first guidance solution path at an intersection with said second guidance solution path;

providing a steering guide including: 1) an upper steering guide arc comprising an illuminated array indicating a course deviation of said vehicle, said array having illuminated and non-illuminated portions left and right of center, said illuminated portions having lengths corresponding to angular deviations of said vehicle course from said guidance path; and 2) a lower steering guide bar having illuminated and non-illuminated portions left and right of center, said illuminated portions having lengths corresponding to offset distances of said vehicle from said guidance path; and connecting the steering guide to the processor and illuminating: 1) said upper steering guide arc corresponding to a course deviation of said vehicle; and 2) said lower steering guide bar corresponding to an offset of said vehicle from said guidance path.

* * * * *